United States Patent [19]

Schramm

[11] 3,859,120

[45] Jan. 7, 1975

[54] EXTERIOR SIDING OF AN ALUMINUM SUBSTRATE COATED WITH A DURABLE LOW GLOSS CLEAR COATING COMPOSITION CONTAINING FLUOROCARBON POLYMER PARTICLES

[75] Inventor: George T. Schramm, Darby, Pa.

[73] Assignee: E. I. du Pont de Nemours and Company, Wilmington, Del.

[22] Filed: Feb. 28, 1973

[21] Appl. No.: 336,762

Related U.S. Application Data

[62] Division of Ser. No. 147,217, May 26, 1971, abandoned.

[52] U.S. Cl.......... 117/132 CF, 52/309, 117/132 B, 117/161 UC, 117/161 UH, 117/161 UT, 117/161 UZ, 161/214, 161/216
[51] Int. Cl... B32b 15/08, B32b 27/20, B32b 27/30
[58] Field of Search.... 117/132 CF, 132 B, 161 UZ, 117/161 UT, 161 UH, 161 UC; 260/900; 52/309; 161/214, 216

[56] References Cited
UNITED STATES PATENTS

| | | | |
|---|---|---|---|
| 2,468,054 | 4/1949 | Ford | 260/87.7 |
| 2,681,324 | 6/1954 | Hochberg | 117/126 |
| 2,777,783 | 1/1957 | Welch | 117/75 |
| 2,976,257 | 3/1961 | Dawe et al. | 117/132 |
| 3,005,795 | 10/1961 | Busse et al. | 260/857 |
| 3,055,852 | 9/1962 | Youse | 117/132 |
| 3,154,506 | 10/1964 | Janssens | 117/161 |
| 3,293,203 | 12/1966 | Paulus | 117/161 |
| 3,294,871 | 12/1966 | Schmitt et al. | 260/900 |
| 3,318,850 | 5/1967 | Stilmar | 117/123 |
| 3,324,069 | 6/1967 | Koblitz et al. | 117/132 |
| 3,361,679 | 1/1968 | Paulus | 252/305 |
| 3,377,193 | 4/1968 | Stilmar | 117/63 |
| 3,431,136 | 3/1969 | Stilmar | 117/70 |
| 3,449,305 | 6/1969 | Stilmar | 117/123 |
| 3,470,014 | 9/1969 | Koblitz et al. | 117/72 |
| 3,704,176 | 11/1972 | Oga et al. | 117/132 CF |
| 3,772,236 | 11/1973 | Soons | 117/132 CF |

FOREIGN PATENTS OR APPLICATIONS

| | | |
|---|---|---|
| 1,031,406 | 6/1966 | Great Britain |
| 1,043,191 | 9/1966 | Great Britain |
| 1,065,780 | 4/1967 | Great Britain |

*Primary Examiner*—Michael Sofocleous

[57] ABSTRACT

The novel coating composition of this invention forms durable, low gloss, clear finishes and is particularly useful as a decorative and protective finish for exterior siding, such as aluminum siding; the coating composition contains as the film-forming binder either an acrylic polymer which can be an alkyl methacrylate or an alkyl acrylate or mixtures thereof in which the alkyl groups have 1–8 carbon atoms, a fluorocarbon polymer of vinylidene fluoride, tetrafluoroethylene and vinyl butyrate, or a mixture of the above acrylic polymer and the fluorocarbon polymer or an acrylic thermosetting enamel; uniformly dispersed in the coating composition are particles of a fluorocarbon polymer of either polytetrafluoroethylene or a copolymer of tetrafluoroethylene/hexafluoropropylene.

4 Claims, No Drawings

AN EXTERIOR SIDING OF AN ALUMINUM SUBSTRATE COATED WITH A DURABLE LOW GLOSS CLEAR COATING COMPOSITION CONTAINING FLUOROCARBON POLYMER PARTICLES

This is a division, of application Ser. No. 147,217, filed May 26, 1971, has been abandoned.

BACKGROUND OF THE INVENTION

This invention relates to a coating composition, and in particular, to a high quality, low gloss, clear coating composition containing fluorocarbon polymer particles.

High gloss, clear coatings and pigmented coatings that form finishes that are weatherable and durable are well known in the art. Typical compositions that contain a fluorocarbon polymer and other resins are shown in Welch U.S. Pat. No. 2,777,783, issued Jan. 15, 1957; Dawe et al., U.S. Pat. No. 2,976,257, issued Mar. 21, 1961; Paulus U.S. Pat. No. 3,293,203, issued Dec. 20, 1966 and British Pat. No. 1,031,406, published June 2, 1966; Fang U.S. Pat. No. 3,340,222, issued Sept. 5, 1967 and British Pat. No. 1,065,780, published Apr. 19, 1967. Coating compositions of interpolymers of vinylidene fluoride are shown in Stilmar patents U.S. Pat. No. 3,318,850, issued May 9, 1967 and U.S. Pat. No. 3,449,305, issued June 10, 1969.

The building industry is presently utilizing aluminum and other metals as exterior siding materials. These metals are exposed to weathering and to the corrosive atmosphere existing in many cities throughout the country and become corroded, develop streaks and a general unsightly appearance. The above clear coating compositions provide an undesirable glaring finish on metal siding materials and a low gloss finish is required to achieve the desired aesthetic effects. Standard flatting agents, such as talc, silica, china clay and the like when blended with the aforementioned highly durable coating compositions, form finishes which fail after relatively short periods of outdoor exposure and are considered unacceptable as a finish for exterior siding.

The novel coating composition of this invention has excellent adhesion to metal substrates and provides a low gloss finish having long term durability and weatherability.

Summary of the Invention

The coating composition of this invention is a clear composition that dries to a low gloss finish and comprises about 1–50 percent by weight of a film-forming binder dissolved in a volatile organic solvent;
wherein the film-forming binder is either
an acrylic polymer consisting essentially of polymerized units of an alkyl acrylate, an alkyl methacrylate or mixtures thereof in which the alkyl groups have 1–8 carbon atoms;
a fluorocarbon polymer consisting essentially of 30–94.5% by weight of vinylidene fluoride, 5–50% by weight of tetrafluoroethylene and 0.5–20% by weight of vinyl butyrate;
a blend of the above acrylic polymer and the above fluorocarbon polymer in a weight ratio of 5:95 to 85:15; or
a thermosetting acrylic composition consisting essentially of
a. an acrylic polymer of up to 6 percent by weight of an $\alpha,\beta$-ethylenically unsaturated carboxylic acid, a constituent which is either styrene, an alkyl acrylate, an alkyl methacrylate, or mixtures thereof wherein the alkyl groups have 1–8 carbon atoms and a hydroxy containing constituent which is either a hydroxy alkyl acrylate or a hydroxy alkyl methacrylate having 2–8 carbon atoms in the alkyl group; and
b. a compatible heat reactive condensate; and
having uniformly dispersed in the coating composition fluorocarbon polymer particles having a diameter of about 0.2 to 10 microns in a fluorocarbon polymer particle to binder weight ratio of about 1:50 to about 1:5,
wherein the fluorocarbon polymer particles are either of polytetrafluoroethylene, a copolymer of tetrafluoroethylene/hexafluoropropylene or a mixture of these two polymers.

DESCRIPTION OF THE INVENTION

The novel coating composition of this invention is a clear solution that preferably contains about 10–40 percent by weight of a film-forming binder. Uniformly dispersed in the composition are fluorocarbon polymer particles, preferably in a fluorocarbon polymer particle to binder ratio of about 1:20 to about 1:10. This particular composition provides a finish which is clear, has a low gloss, excellent weatherability, durability, adhesion to the metal substrate and will not crack, craze, chip or peel even after long periods of outdoor exposure.

The composition is also suitable for interior use for protective and decorative coatings on a variety of metal substrates, such as railings, window frames, door frames, doors, outdoor signs and the like.

The term "low gloss" refers to a surface that has a reflectance of about 10 to 65 percent measured at 60° with a standard glossimeter.

The film-forming binder utilized in the novel coating composition of this invention is either an acrylic polymer, a fluorocarbon polymer mixture of these two polymers or a thermosetting acrylic composition.

The acrylic polymer is of polymerized acrylic acrylate monomer, alkyl methacrylate monomer or mixtures thereof in which the alkyl groups have 1–8 carbon atoms. Typical monomers that can be utilized to form these acrylic polymers are, for example, methyl methacrylate, propyl methacrylate, butyl methacrylate, isobutyl methacrylate, hexyl methacrylate, 2-ethylhexyl methacrylate, ethyl acrylate, propyl acrylate, butyl acrylate, hexyl acrylate, 2-ethylhexyl acrylate and the like. Optionally, up to 5 percent of the acrylic polymer may be of a $\alpha,\beta$-unsaturated carboxylic acid, such as acrylic acid, methacrylic acid, crotonic acid, ethacrylic acid, itaconic acid, and the like. Acrylic and methacrylic acids are preferred if an acid constituent is to be utilized.

Up to 5 percent by weight, based on the weight of the acrylic polymer of acrylic monomers having adhesion promoting groups, can be utilized. Typical monomers which provide these adhesion promoting groups are hydroxyaminopropyl methacrylate, diethylaminoethyl methacrylate, dimethylaminoethyl methacrylate, 2-aminopropyl methacrylate, 2-aminoethyl methacrylate, 2-butylaminoethyl methacrylate, 2-(1-aziridinyl)-ethyl methacrylate, n-2-hydroxypropyl methacrylamide, n-2-hydroxyethyl methacrylamide, 3-(2-methacryloxyethyl)-2,2-spirocyclohexyl oxazolidine.

Also, up to 3 percent by weight, based on the weight of the acrylic polymer of a glycidyl methacrylate or glycidyl acrylate can be used. The glycidyl group can be reacted with an acid such as phosphoric acid to modify the properties of the polymer.

One preferred acrylic polymer which forms a durable, high quality coating composition is of 40–60 percent by weight of butyl methacrylate, and correspondingly, 60–40 percent by weight of isobutyl methacrylate. Another acrylic polymer useful in this invention is of 85–99 percent by weight of methyl methacrylate, and correspondingly, 1–15 percent by weight of 3-(2-methacryloxy ethyl)-2,2-spirocyclohexyl oxazolidine. Still another acrylic polymer useful in this invention is of 50–70 percent by weight of methyl methacrylate, 49–27 percent by weight of ethyl acrylate and 1–3 percent by weight of glycidyl methacrylate in which the glycidyl methacrylate is reacted with phosphoric acid.

The film-forming fluorocarbon polymer can also be utilized in the novel coating composition of this invention. Particularly useful interpolymers of vinylidene fluoride are taught in the Stilmar patents U.S. Pat. No. 3,318,850 and U.S. Pat. No. 3,449,305.

One particular class of fluorocarbon polymers useful in this invention are prepared by polymerizing vinylidene fluoride with about 0.1 to about 0.4 moles of tetrafluoroethylene per mole of vinylidene fluoride, and about 0.05 to about 0.3 moles per mole of vinylidene fluoride of at least one vinyl ester of alkane carboxylic acid having 2–18 carbon atoms. One particularly useful fluorocarbon polymer of this type consists essentially of 65–70 percent by weight of vinylidene fluoride, 18–27 percent by weight of tetrafluoroethylene and 8–15 percent by weight of vinyl butyrate. One highly preferred polymer of this class contains vinylidene fluoride/tetrafluoroethylene/vinyl butyrate in a weight ratio of 68/22/10.

Blends of the above acrylic polymer and fluorocarbon polymer can be utilized as the film-forming binder to form an excellent coating composition. Generally, the acrylic polymer and the fluorocarbon polymer are utilized in a weight ratio of 5:95 to 85:15. One particularly preferred composition is a 10:90 to 30:70 blend of polymethyl methacrylate to the aforementioned vinylidene fluoride/tetrafluoroethylene/vinyl butyrate polymers having a weight ratio of 68/22/10.

The thermosetting acrylic composition that can be used as a binder in the novel composition of the invention contains a 50–95 percent by weight of an acrylic polymer, and correspondingly, 5–50 percent by weight of a compatible heat reactive condensate. Preferably, 75–90 percent by weight of the acrylic polymer is used with 10–25 percent of the heat reactive condensate.

The acrylic polymer used in the thermosetting acrylic composition used in this invention contains about 0–6 percent by weight of an $\alpha,\beta$-ethylenically unsaturated monocarboxylic acid. Typically useful $\alpha,\beta$-ethylenically unsaturated monocarboxylic acids used to prepare the acrylic polymer are acrylic acid, methacrylic acid, crotonic acid and the like. Preferred are acrylic acid and methacrylic acid since these acids form a high quality polymer.

The acrylic polymer contains about 20–95 percent by weight of an alkyl methacrylate or an alkyl acrylate or a mixture of these esters. Any of the aforementioned acrylate or methacrylate esters can be used having 1–8 carbon atoms in the alkyl group.

The acrylic polymer contains 5–20 percent by weight of a hydroxy containing compound. Typical useful hydroxy containing compounds are hydroxyalkyl acrylates or hydroxyalkyl methacrylates in which the alkyl group contains 2–8 carbon atoms; for example, hydroxyethyl acrylate, hydroxypropyl acrylate, hydroxybutyl acrylate, hydroxyhexyl acrylate, hydroxyoctyl acrylate and the like, hydroxyethyl methacrylate, hydroxypropyl methacrylate, hydroxybutyl methacrylate, hydroxyhexyl methacrylate, hydroxyoctyl methacrylate and the like.

One preferred acrylic polymer used to form the novel coating composition of this invention is of methyl methacrylate, of styrene, an alkyl acrylate in which the alkyl group has 2–4 carbon atoms, a hydroxyalkyl acrylate or methacrylate in which the alkyl group has 2–4 carbon atoms and an $\alpha,\beta$-unsaturated monocarboxylic acid which is either acrylic acid or methacrylic acid.

Another preferred acrylic polymer used to form the novel coating of this invention contains 0–18 percent by weight styrene, 25–45 percent by weight methyl methacrylate, 40–43 percent by weight of an alkyl acrylate, 8–18 percent by weight of a hydroxyalkyl methacrylate, or a hydroxyalkyl acrylate having 2–4 carbon atoms in the alkyl group, 1–4 percent by weight of either acrylic acid or methacrylic acid.

Another particularly useful acrylic polymer is a polymer of about 45–55 percent by weight styrene, 35–45 percent by weight butyl acrylate, 5-15 percent by weight hydroxyethyl acrylate and 2–6 percent by weight acrylic acid.

The heat reactive condensate used in the thermosetting acrylic composition gives the composition its thermosetting characteristics and improves the composition's hardness, solvent resistance, alkali and heat resistance. Preferred heat reactive condensates used to prepare the thermosetting composition used in this invention are alkylolated melamine/formaldehyde resins or a mixture of an alkylolated melamine/formaldehyde resin and urea formaldehyde. Those preferred alkylolated melamine formaldehyde resins have 1–4 carbon atoms in the alkyl group and are those that are well known in the art. These resins are prepared by conventional techniques in which a lower alkyl alcohol such as methanol, ethanol, butanol, isobutanol, propanol, isopropanol and the like is reacted with the melamine/formaldehyde resin to provide pendent alkoxy group or groups. One preferred melamine resin used in this invention because of its availability and since it forms a high quality coating composition is butylolated melamine/formaldehyde.

Any of the conventional solvents and diluents can be used to prepare the novel coating composition of this invention, for example, toluene, xylene, butyl acetate, acetone, methylethyl ketone, methylisobutyl ketone, butyl alcohol, hexane, cellosolve, cellosolve acetate and mineral spirits and other aliphatic, cycloaliphatic, aromatic hydrocarbons, esters, ethers, ketones and alcohols.

The novel composition of this invention contains fluorocarbon polymer particles dispersed uniformly therein. These pigments have a diameter of about 0.2 to 10 microns. Pigments of polytetrafluoroethylene can be used, preferably, pigments of a copolymer of tetrafluoroethylene/hexafluoropropylene are utilized. The preferred copolymer contains 75–95 percent by weight of tetrafluoroethylene, and correspondingly, 5–25 percent by weight of hexafluoropropylene.

Generally, the fluorocarbon polymer particles are formed into a mill base and then blended with the solvent solution of the film-forming polymer to form the novel coating composition of this invention. This mill base is prepared by conventional techniques in which the fluorocarbon polymer particles are ground with any of the aforementioned solvents and about 0.5–5 percent by weight of a conventional resin, such as an alkyd resin or an acrylic resin, or one of the aforementioned film-forming binders can be utilized. The mill base can be ground in a ball mill, a pebble mill, or in a conventional sand mill to uniformly disperse the fluorocarbon polymer particles in the mill base. Then the mill base is blended with a solution of the film-forming polymeric binder.

Small amounts of dyes, colored pigments or lakes can be blended in with the novel coating composition of this invention to give the coating a slight color. However, these additional colorants should not obscure the clarity of the resulting coating. Also, any of the conventional ultraviolet screening agents can be used in the novel composition.

The novel composition can be applied to the metal substrate by any of the usual methods, such as spraying, electrostatic spraying, dipping, brushing, flow-coating and the like. The coating can be air dried but preferably is force dried by heating the coating to about 100°–200°C. for about 5 to 30 minutes. The resulting coating is about 0.1–5 mils thick, and preferably, a coating of about 0.2–1.5 mils is utilized to provide a clear, low gloss finish to a metal substrate that is durable and weatherable.

The following Examples illustrate the invention. Parts and percentages are by weight unless otherwise specified.

EXAMPLE 1

The following ingredients are blended together to form polymer solution A:

|  | Parts by Weight |
|---|---|
| Xylol | 1275 |
| Petroleum Naphtha (boiling range 88–142°C.) | 186 |
| Toluene | 150 |
| Butyl acetate | 939 |
| Acrylic resin — (50/50% by weight of butyl methacrylate/isobutyl methacrylate) | 450 |
| Total | 3000 |

A fluorocarbon polymer dispersion is prepared as follows:

|  | Parts By Weight |
|---|---|
| Methyl isobutyl ketone | 680 |
| Methyl methacrylate copolymer (40% solids in acetone/toluene solvent of methyl methacrylate/3-(2-methacryloxy ethyl)-2,2-spirocyclohexyl oxazolidine, 95/5% by weight) | 20 |
| Finely divided FEP polymer (tetrafluoroethylene/hexafluoropropylene copolymer, 89/11% by weight) | 300 |
| Total | 1000 |

The above ingredients are blended together and charged into a pebble mill and ground to form a dispersion.

A coating composition is prepared by blending the following ingredients:

|  | Parts By Weight |
|---|---|
| Polymer solution A | 900 |
| Fluorocarbon polymer dispersion | 100 |
| Total | 1000 |

The above coating composition is drawn down with a No. 40 wire wound rod on an Duronodic aluminum plate and the coating is allowed to dry for 15 minutes and then is force dried for 10 minutes at about 100°C. The resulting film is about 0.35 mils thick, has an excellent clear appearance, has a gloss measured at 60° of 17 percent and is resistant to weathering for long periods of time.

Polymer solution A without the fluorocarbon polymer dispersion is coated onto a Duronodic aluminum substrate and dried as above. The gloss measured at 60° is 74 percent.

EXAMPLE 2

The following ingredients are blended together:

|  | Parts By Weight |
|---|---|
| Xylol | 42.50 |
| Solvent blend (petroleum naphtha/toluene, weight ratio 55/45) | 11.25 |
| Butyl acetate | 31.25 |
| Acrylic resin (identified in Example 1) | 15.00 |
| Total | 100.00 |

A coating composition is prepared by blending the following ingredients:

|  | Parts By Weight |
|---|---|
| Polymer solution (prepared above) | 96.25 |
| Fluorocarbon polymer dispersion (described in Example 1) | 3.75 |
| Total | 100.00 |

The above coating composition is applied to a Duronodic aluminum plate and dried as in Example 1. The coating has a clear appearance and has a low level of gloss. After exposure to a standard "Weather-O-Meter" for 2,000 hours, the coating retains its low gloss and excellent appearance.

EXAMPLE 3

The following ingredients are blended together to form a polymer solution:

|  | Parts By Weight |
|---|---|
| Fluoropolymer B solution (40% by weight of 68/22/10 vinylidene fluoride/tetrafluoroethylene/vinyl butyrate copolymer, prepared according to U.S. Patent 3,449,305, in methylethyl ketone) | 1200 |

-Continued

| | Parts By Weight |
|---|---|
| Acrylic resin solution (30% by weight of a 98/2 methyl methacrylate/glycidyl methacrylate copolymer in a 5:4 toluene/isopropanol solvent) | 201 |
| Methyl methacrylate solution (40% solids in a 2:1 toluene/acetone solvent) | 150 |
| Methylethyl ketone | 300 |
| Methylisobutyl ketone | 600 |
| Butyl acetate | 549 |
| Total | 3000 |

The following coating compositions are formulated from the above polymer solution:

| | Parts By Weight |
|---|---|
| Coating Composition 1 | |
| Polymer solution (prepared above) | 900 |
| Fluorocarbon polymer dispersion (prepared in Example 1) | 100 |
| Total | 1000 |
| Coating Composition 2 | |
| Polymer solution (prepared above) | 950 |
| Fluorocarbon polymer dispersion (prepared in Example 1) | 50 |
| Total | 1000 |

Each of the above coating compositions are applied to a Duronodic aluminum plate and dried as in Example 1. The resulting dried coating is about 0.3 mils in thickness. The gloss at 60°C. of each of the coatings is 16 percent and 30 percent respectively. Each coating has an excellent clear appearance and retains this low gloss clear appearance even after 2,000 hours' exposure in a standard "Weather-O-Meter." The panels retain a high quality appearance and do not show dulling, cracking or crazing after the weathering exposure.

EXAMPLE 4

The following ingredients are blended together to form a binder solution:

| | Parts By Weight |
|---|---|
| Acrylic polymer solution (60% solids of a polymer of styrene/butyl acrylate/hydroxy ethyl acrylate/acrylic acid, weight ratio of 50/38/8/4 in xylene/hydrocarbon solvent that has a boiling point of 150–190°C. and an aniline point of −28°C.) | 133.5 |
| Butylolated melamine formaldehyde (55% solids in butanol/xylene) | 61.8 |
| Ultraviolet light screening agent | 5.7 |
| Toluene | 89.1 |
| Butanol | 9.9 |
| Total | 300.0 |

A fluorocarbon polymer dispersion is prepared as follows:

| | Parts By Weight |
|---|---|
| Finely divided FEP polymer (described in Example 1) | 30 |
| Acrylic polymer solution (described above) | 5 |
| Methyl isobutyl ketone | 65 |
| Total | 100 |

The above ingredients are mixed together and charged into a pebble mill and ground to form a dispersion.

A coating composition is prepared by blending the following ingredients:

| | Parts By Weight |
|---|---|
| Binder solution (prepared above) | 80 |
| Fluorocarbon polymer dispersion (prepared above) | 20 |
| Total | 100 |

The above coating composition is applied to a Duronodic aluminum plate and dried as in Example 1. The coating has a clear appearance and has a low level of gloss. After exposure to a standard "Weather-O-Meter" for 2,000 hours, the coating retains its low gloss and excellent appearance.

EXAMPLE 5

The following ingredients are blended together to form a binder solution:

| | Parts By Weight |
|---|---|
| Acrylic polymer solution (40% solids of a polymer of methyl methacrylate/ethyl acrylate/glycidyl methacrylate weight ratio of 60/39/1 phosphated with phosphoric acid in xylene) | 37.5 |
| Xylene | 31.3 |
| Butyl acetate | 31.2 |
| Total | 100.0 |

A fluorocarbon polymer dispersion is prepared as follows:

| | Parts By Weight |
|---|---|
| Finely divided FEP polymer (described in Example 1) | 25.0 |
| Acrylic polymer solution (described above) | 12.5 |
| Methylisobutyl ketone | 62.5 |
| Total | 100.0 |

The above ingredients are mixed together and charged into a pebble mill and ground to form a dispersion.

A coating composition is prepared by blending the following ingredients:

| | Parts By Weight |
|---|---|
| Binder solution (prepared above) | 96 |
| Fluorocarbon polymer dispersion (prepared above) | 4 |
| Total | 100 |

The above coating composition is applied to Alodine aluminum plates and dried as in Example 1. The resulting film is about 0.3 mils thick and has a gloss measured at 60° of 65 percent. After exposure to a standard "Weather-O-Meter" for 2,000 hours, the coating retains its low gloss and excellent appearance.

What is claimed is:

1. An exterior siding comprising an aluminum substrate having firmly adhered thereto a clear semigloss synthetic thermoplastic resin coating about 0.1–5 mils in thickness and having a gloss of 10–65 percent measured at 60°;

said coating consisting essentially of a coalesced thermoplastic film-forming binder having fluorocarbon polymer particles uniformly dispersed therein;

said fluorocarbon polymer particles having a diameter of about 0.2–10 microns and are in a fluorocarbon particle to binder weight ratio of about 1:50 to 1:5 and said fluorocarbon polymer particles are selected from the group consisting of polytetrafluoroethylene, a copolymer of tetrafluoroethylene/hexafluoropropylene and mixtures thereof; and said thermoplastic film-forming binder consists essentially of a copolymer of butyl methacrylate and isobutyl methacrylate.

2. The exterior siding of claim 1 wherein the fluorocarbon polymer particle to binder ratio is from about 1:20 to about 1:10 and the fluorocarbon polymer particles are of a copolymer of tetrafluoroethylene/hexafluoropropylene in which the weight ratio of tetrafluoroethylene to hexafluoropropylene is 75–95 to 25–5.

3. The exterior siding of claim 2 in which the binder is a copolymer of 40–60 percent by weight of butyl methacrylate and correspondingly, 60–40 percent by weight of isobutyl methacrylate.

4. The exterior siding of claim 1 in which the fluorocarbon polymer particle to binder ratio is from 1:20 to about 1:10 and the fluorocarbon polymer particles are a copolymer of tetrafluoroethylene/hexafluoropropylene wherein the weight ratio of tetrafluoroethylene to hexafluoropropylene is about 75–95 to 25–5 and in which the binder is a copolymer of 40–60 percent by weight of butyl methacrylate and correspondingly, 60–40 percent by weight of isobutyl methacrylate.

* * * * *